(12) United States Patent
Marchena et al.

(10) Patent No.: US 8,876,132 B2
(45) Date of Patent: Nov. 4, 2014

(54) FRONT END ASSEMBLY FOR VEHICLE CHASSIS

(71) Applicant: Ford Motor Company, Dearborn, MI (US)

(72) Inventors: Patrick Marchena, Berkley, MI (US); Mark Andrew Kessen, Shelby Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/853,028

(22) Filed: Mar. 28, 2013

(65) Prior Publication Data
US 2014/0091599 A1    Apr. 3, 2014

(51) Int. Cl.
*B62D 21/11*    (2006.01)
*B62D 25/08*    (2006.01)

(52) U.S. Cl.
CPC ..................................... *B62D 25/08* (2013.01)
USPC .................... 280/124.109; 180/311; 280/788; 296/204

(58) Field of Classification Search
CPC .. B62D 21/11; B62D 21/155; B60G 2204/15; B60G 2206/60; B60G 2206/604; B60G 2206/606
USPC ........... 180/311, 312; 280/784, 788, 124.106, 280/124.107, 124.109; 296/193.07, 193.09, 296/203.02, 204
See application file for complete search history.

(56) References Cited

U.S. PATENT DOCUMENTS

| | | | | |
|---|---|---|---|---|
| 2,638,356 A * | 5/1953 | Butterfield et al. | ..... | 280/124.153 |
| 3,441,289 A * | 4/1969 | Ryszewski et al. | ........... | 280/788 |
| 3,869,017 A * | 3/1975 | Feustel et al. | ................. | 180/232 |
| 3,957,127 A * | 5/1976 | Bouchard et al. | ............. | 248/599 |
| 4,240,517 A * | 12/1980 | Harlow et al. | ................. | 180/295 |
| 4,263,980 A * | 4/1981 | Harlow et al. | ................. | 180/292 |
| 4,966,384 A * | 10/1990 | Endo et al. | ............. | 280/124.109 |
| 5,031,928 A * | 7/1991 | Tsubota et al. | ........... | 280/86.756 |
| 5,609,366 A * | 3/1997 | Kamei et al. | ................... | 280/788 |
| 5,611,569 A * | 3/1997 | Sekiguchi et al. | ............ | 280/788 |
| 5,862,877 A * | 1/1999 | Horton et al. | ................. | 180/312 |
| 6,109,654 A * | 8/2000 | Yamamoto et al. | ........... | 280/784 |
| 6,193,274 B1 * | 2/2001 | Brown et al. | ................. | 280/784 |
| 6,402,172 B1 * | 6/2002 | Suzuki | ................... | 280/124.109 |
| 6,409,216 B2 * | 6/2002 | Suzuki | .......................... | 280/781 |
| 6,494,472 B2 * | 12/2002 | Suzuki | ................... | 280/124.109 |
| 6,511,096 B1 * | 1/2003 | Kunert et al. | ................. | 280/785 |
| 6,679,523 B2 * | 1/2004 | Yamamoto et al. | ........... | 280/785 |
| 6,708,793 B2 * | 3/2004 | Witherspoon et al. | ........ | 180/291 |
| 6,733,040 B1 * | 5/2004 | Simboli | ........................ | 280/800 |
| 6,739,624 B2 * | 5/2004 | Barber et al. | ................. | 280/781 |

(Continued)

*Primary Examiner* — Paul N Dickson
*Assistant Examiner* — Laura Freedman
(74) *Attorney, Agent, or Firm* — Shook Hardy & Bacon, LLP (57) ABSTRACT

A front sub-assembly for an automotive vehicle is disclosed. The front sub-assembly includes a pair of spaced apart, substantially hollow side assemblies. Each of the side assemblies includes an upper side member and a lower side member. The front ends of the side assemblies are joined together by a front cross member that includes a front cross member reinforcing bracket and an internal mass dampener. The rear ends of the side assemblies are joined by an upper cross member and a lower cross member. A plurality of brackets, including body mount brackets, a steering gear bracket, an exhaust mount bracket, and a roll restrictor bracket are also strategically provided. The brackets as well as other components are preferably formed from stamped steel.

18 Claims, 7 Drawing Sheets

(56) References Cited

U.S. PATENT DOCUMENTS

| | | | |
|---|---|---|---|
| 6,880,663 B2* | 4/2005 | Fujiki et al. | 180/232 |
| 7,360,621 B2* | 4/2008 | Komiya | 180/312 |
| 7,520,514 B2* | 4/2009 | Ogawa et al. | 280/124.109 |
| 7,584,815 B2* | 9/2009 | Ogawa et al. | 180/312 |
| 7,771,137 B2* | 8/2010 | Anzai et al. | 403/379.3 |
| 7,857,349 B2* | 12/2010 | Fujiki et al. | 280/785 |
| 7,958,963 B2* | 6/2011 | Hornisch et al. | 180/312 |
| 7,988,164 B2* | 8/2011 | Schmidt et al. | 280/124.107 |
| 8,408,566 B2* | 4/2013 | Teichmann et al. | 280/124.109 |
| 8,465,054 B1* | 6/2013 | Wlotkowski et al. | 280/781 |
| 8,500,191 B1* | 8/2013 | Baccouche et al. | 296/187.08 |
| 8,702,148 B2* | 4/2014 | Ichikawa | 296/70 |
| 8,708,401 B2* | 4/2014 | Lee et al. | 296/187.03 |
| 2003/0127844 A1* | 7/2003 | Gloceri et al. | 280/788 |
| 2006/0284449 A1* | 12/2006 | Miyahara | 296/204 |
| 2007/0132223 A1* | 6/2007 | Scheffzuek | 280/784 |

* cited by examiner

FRONT END ASSEMBLY FOR VEHICLE CHASSIS

CROSS-REFERENCE TO PRIORITY APPLICATION

This application claims priority to China design patent application no. 201230469497.3 (filed Sep. 28, 2012), which is incorporated herein by reference in its entirety and the benefit of which is hereby claimed.

TECHNICAL FIELD

The disclosed invention relates generally to vehicle chassis assemblies. More particularly, the inventive concept disclosed herein relates to a front subassembly for a vehicle chassis having stamped and formed components that are formed for reduced weight, increased strength and improved packaging.

BACKGROUND OF THE INVENTION

While not usually appreciated by the ordinarily observer, the vehicle chassis has undergone a substantial degree of change since early days of automobile design. Early frame design in, for example, the Ford Model T, comprised a pair of equally spaced apart and straight rails, a front cross member, and a rear cross member. The front transverse spring was attached to the front cross member and the rear transverse spring was attached to the rear cross member. The body rested on the frame rails while lips of the sheet metal components including the running board apron and, later in production, the rear fender fit between the frame rails and the body.

As vehicle technology advanced, the vehicle frame design became increasingly complex. Yet for many years standard approaches to chassis construction included the frame to which the front end and rear end were attached.

Over time, attention was increasingly drawn to vehicle safety, weight reduction and cost savings. While truck design has continued to rely on a frame as the core element of the chassis, passenger car design more commonly relies upon a front end assembly and a rear end assembly being attached to a body structure.

Some vehicles, for example British racing vehicles, provided a hybrid approach using a front frame structure attached to a fire wall while the rear assembly was suspended from the monocoque body.

Conventional front sub-assemblies are often made by stamping and welding together several individual frame components. Such arrangements provide the necessary structure but still often suffer from excess weight and expensive manufacturing costs. It is clear that vehicle front end designs have yet to take full advantage of weight reduction and reduced complexity by relying upon a reduced number of components.

Accordingly, there is a need for a front sub-assembly construction for a vehicle chassis that can provide safety and reduced weight for increased fuel economy without sacrificing rigidity and strength.

SUMMARY OF THE INVENTION

The disclosed invention overcomes several of the problems of the prior art by providing a front end assembly for a vehicle that incorporates a reduced number of parts, thus reducing weight, yet provides safety and rigidity of more complex front end assembly designs.

The front sub-assembly of the disclosed inventive concept includes a pair of spaced apart, substantially hollow side assemblies. Each of the side assemblies includes an upper side member and a lower side member.

The front ends of the side assemblies are joined together by a front cross member that includes a front cross member reinforcing bracket and an internal mass dampener. The rear ends of the side assemblies are joined by an upper cross member and a lower cross member.

A plurality of brackets, including body mount brackets, a steering gear bracket, an exhaust mount bracket, and a roll restrictor bracket are also strategically provided. The brackets as well as other components are preferably formed from stamped steel.

The front sub-assembly of the disclosed inventive concept provides a construction that comprises a reduced number of parts and thus realizes overall weight reduction without sacrificing strength or safety.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

In the following figures, the same reference numerals will be used to refer to the same components. In the following description, various operating parameters and components are described for different constructed embodiments. These specific parameters and components are included as examples and are not meant to be limiting.

The figures show various views of the front sub-assembly of the disclosed inventive concept. With reference thereto, a front sub-assembly according to the disclosed inventive concept is generally illustrated as 10. The front sub-assembly 10 includes a pair of spaced apart, substantially hollow side assemblies 12 and 12'. The substantially hollow side assembly 12 includes an upper side member 14 and a lower side member 16. The substantially hollow side assembly 12' includes an upper side member 14' and a lower side member 16'.

Figure 3:
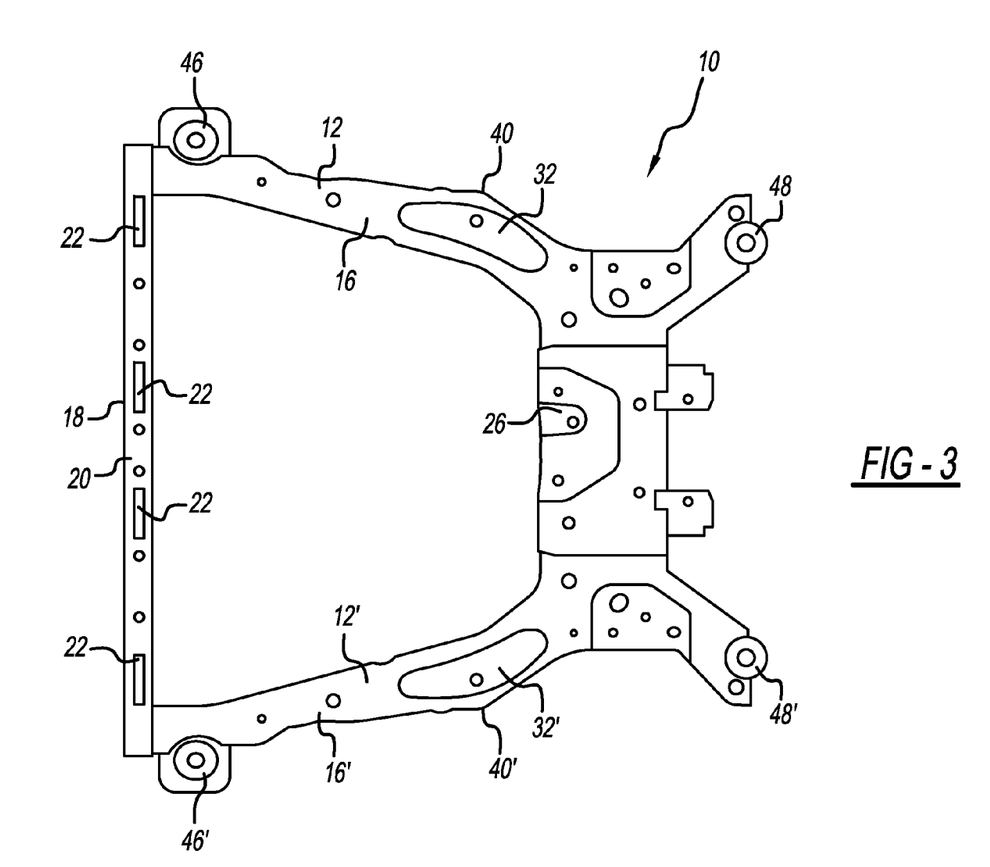
FIG. 3 is a bottom view of an automotive vehicle front end assembly according to the disclosed inventive concept.
Figure 4:
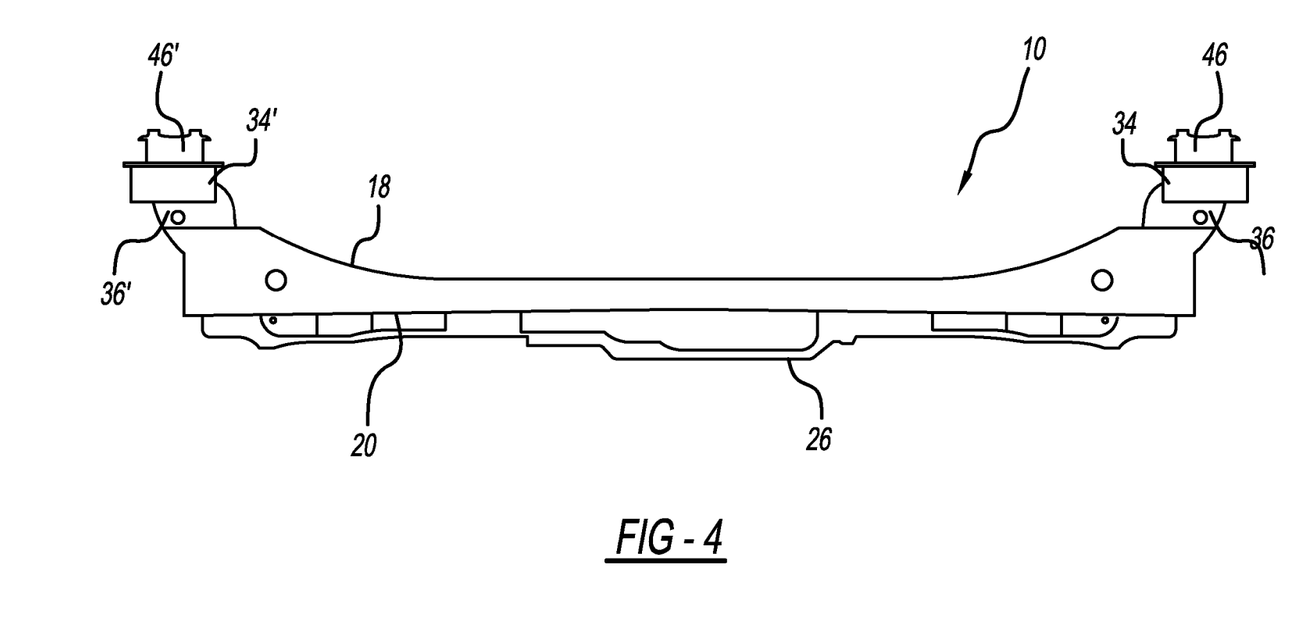
FIG. 4 is a front elevated view of an automotive vehicle front end assembly according to the disclosed inventive concept.
Figure 5:
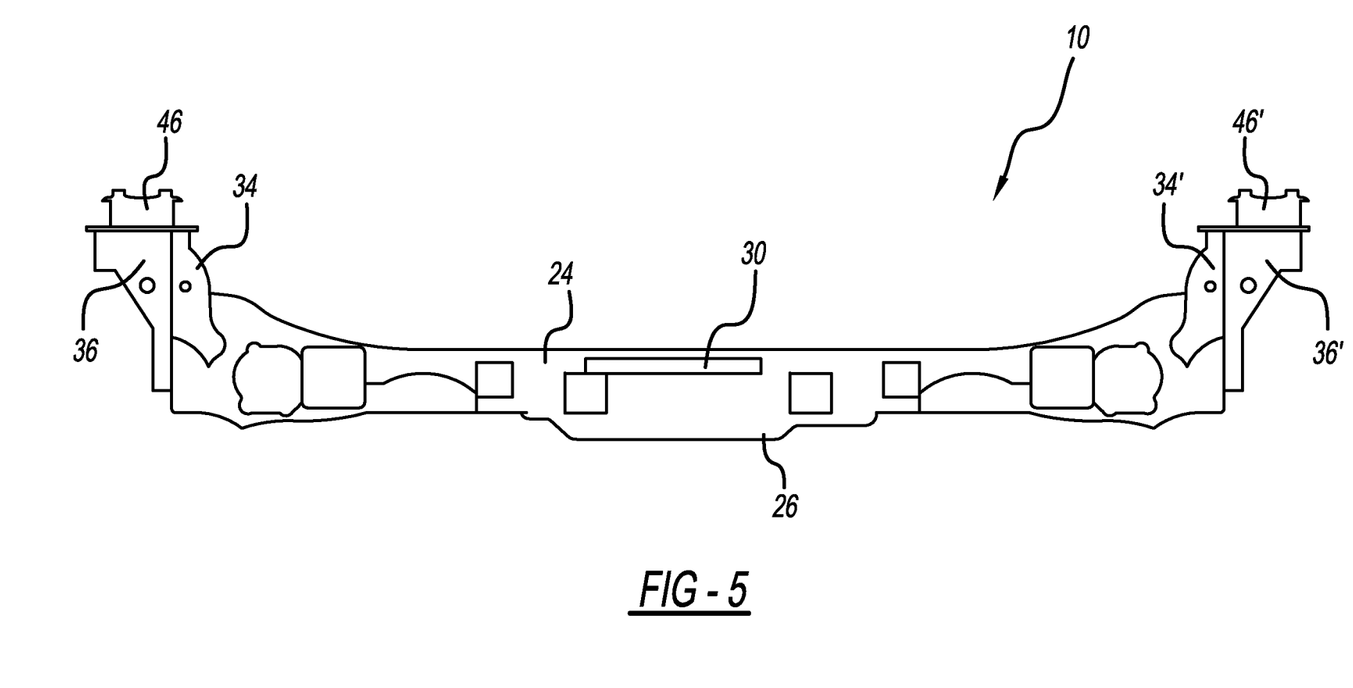
FIG. 5 is a rear elevated view of an automotive vehicle front end assembly according to the disclosed inventive concept.
Figure 6:
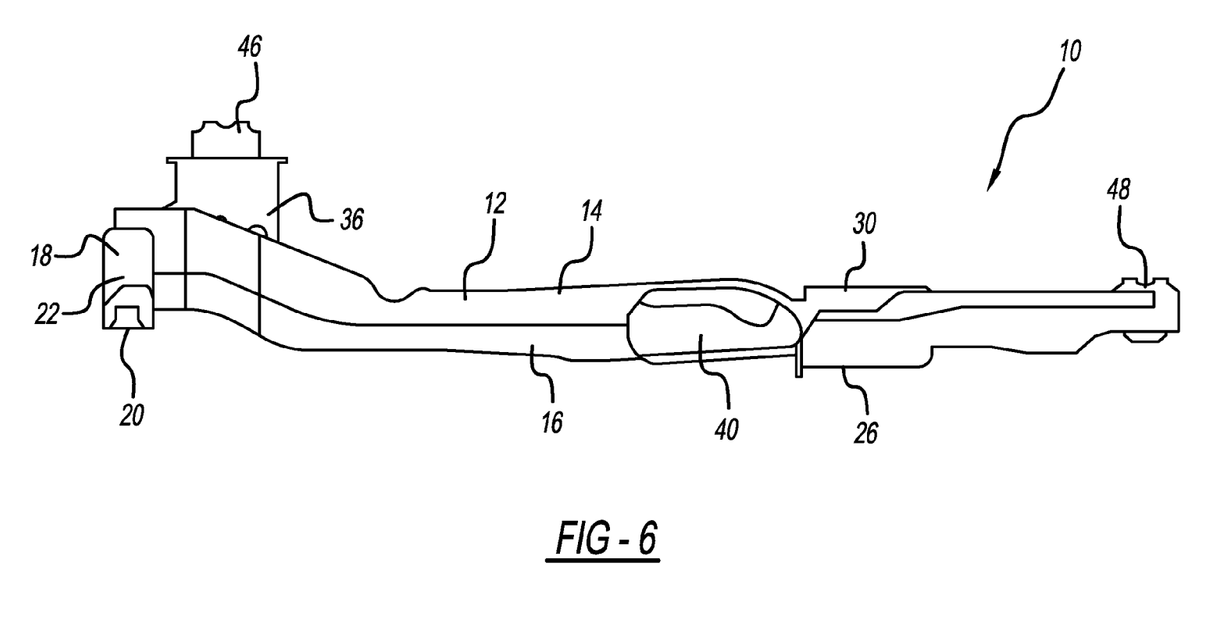
FIG. 6 is a left side elevated view of an automotive vehicle front end assembly according to the disclosed inventive concept.
Figure 7:
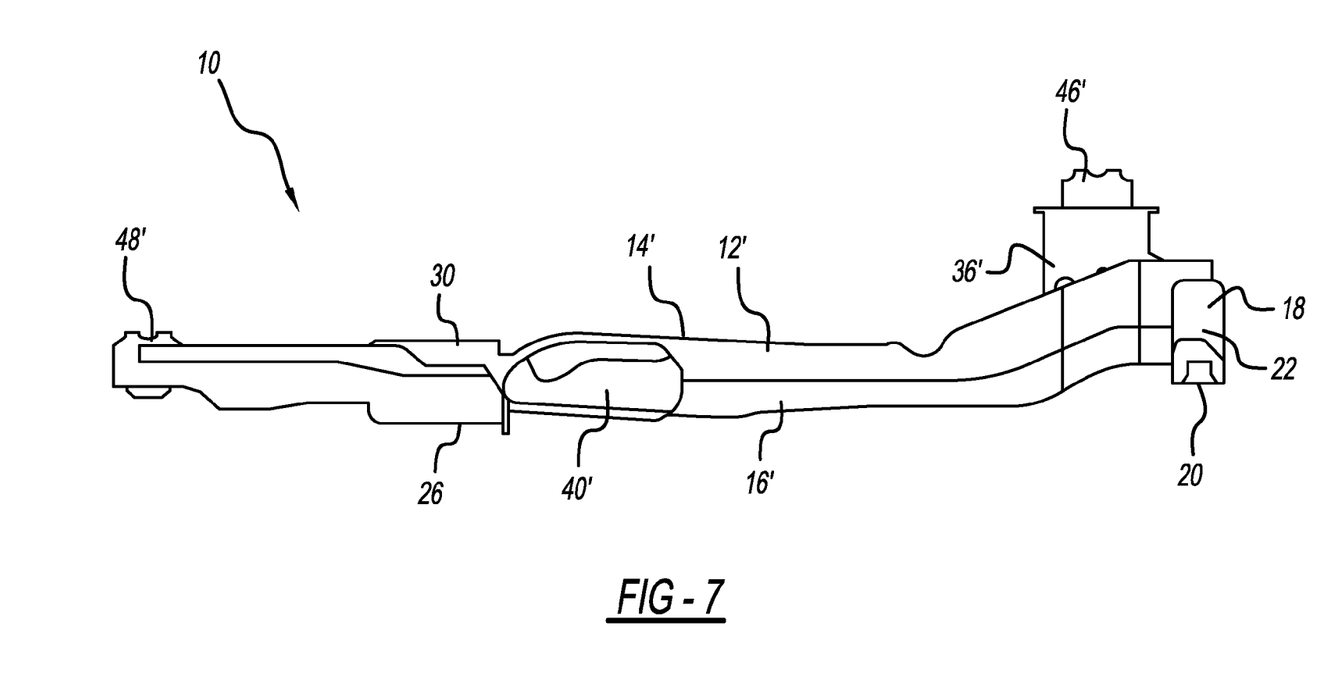
FIG. 7 is a right side elevated view of an automotive vehicle front end assembly according to the disclosed inventive concept.

The front ends of the side assemblies 12 and 12' are joined together by a front cross member 18 that includes a front cross member reinforcing bracket 20 and an internal mass dampener 22 (shown in part in FIG. 3 through the apertures formed in the front cross member 18 and in FIGS. 6 and 7).

The rear ends of the side assemblies 12 and 12' are joined by an upper cross member 24 and a lower cross member 26. The upper cross member 24 has a u-shaped cut-out area 28. Provided substantially within the u-shaped cut-out area 28 is a u-shaped roll restrictor bracket 30.

A plurality of brackets are strategically provided on the front sub-assembly 10. Particularly, and referring to FIG. 3, a front lower control arm bracket 32 is fitted to the underside of the lower side member 16 of the side assembly 12. A front lower control arm bracket 32' is fitted to the underside of the lower side member 16' of the side assembly 12'.

A front body mount bracket 34 is attached to the forward portion of the upper side member 14 of the side assembly 12. A front body mount bracket 34' is attached to the forward portion of the upper side member 14' of the side assembly 12'.

Opposite the front body mount bracket 34 is an outer body mount bracket 36 that is also attached to the forward portion of the upper side member 14 of the side assembly 12. Opposite the front body mount bracket 34' is an outer body mount bracket 36' that is also attached to the forward portion of the upper side member 14' of the side assembly 12'.

A body mount top plate 38 is attached to the upper sides of the front body mount bracket 34 and the outer body mount bracket 36. A body mount top plate 38' is attached to the upper sides of the front body mount bracket 34' and the outer body mount bracket 36'.

A side member reinforcing bracket 40 is attached to the side of the side assembly 12. A side member reinforcing bracket 40' is attached to the side of the side assembly 12'.

Figure 1:
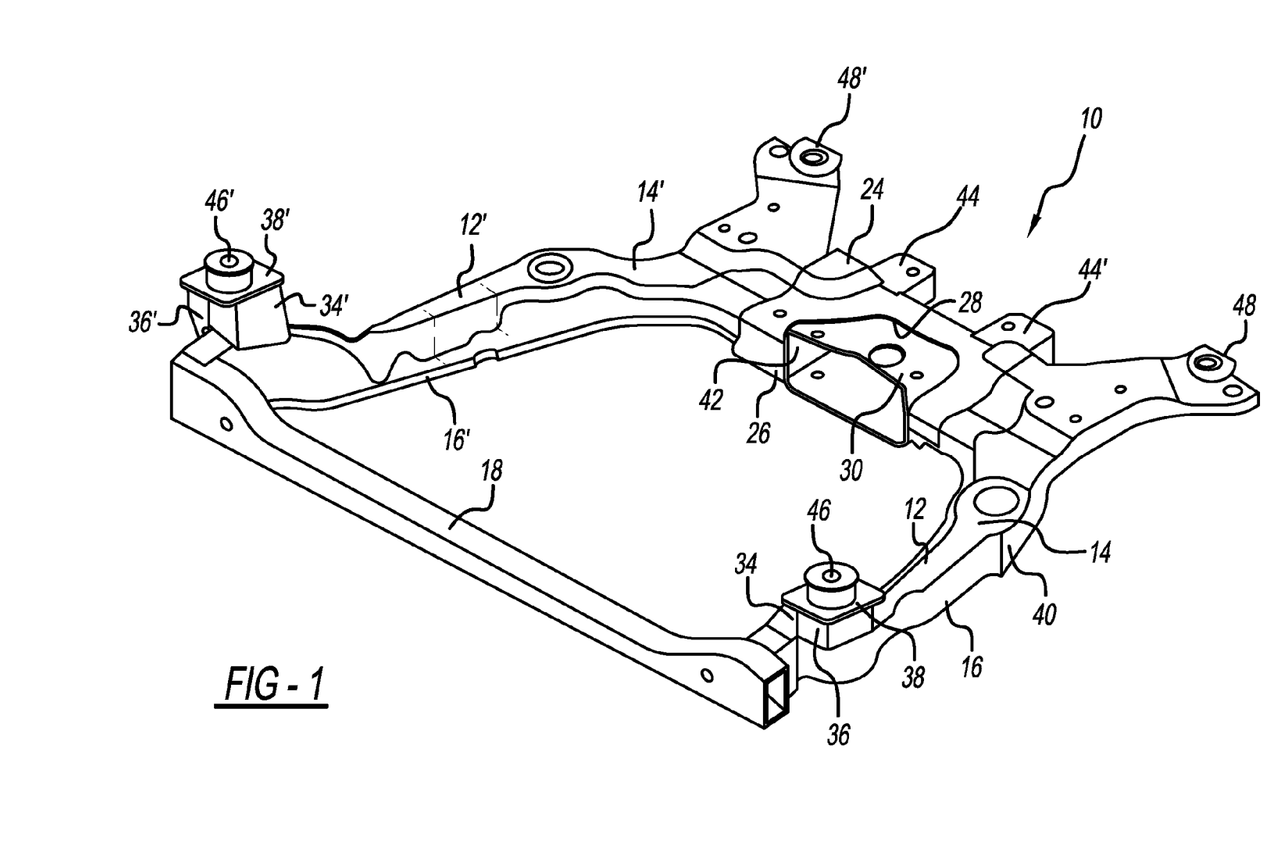
FIG. 1 is an isometric view of an automotive vehicle front end assembly according to the disclosed inventive concept.
Figure 2:
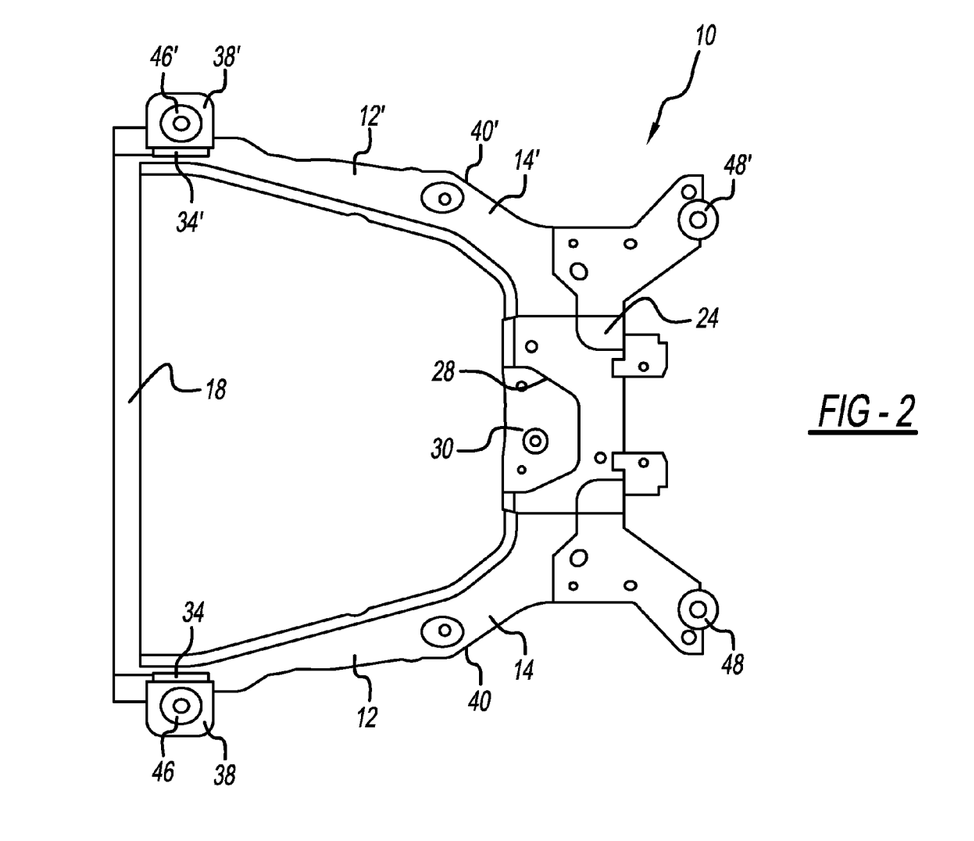
FIG. 2 is a top view of an automotive vehicle front end assembly according to the disclosed inventive concept.

A pair of opposed, spaced apart support brackets are provided between the upper cross member 24 and the lower cross member 26. One such bracket, bracket 42, is shown in FIG. 1.

Exhaust manifold brackets 44 and 44' are fitted vehicle rearward to the back sides of the upper cross member 24 and a lower cross member 26.

A front bushing assembly 46 is fitted to the body mount top plate 38. A front bushing assembly 46' is fitted to the body mount top plate 38'. Similarly, a rear bushing assembly 48 is fitted to the top side of the rear end of the upper side member 14 and a rear bushing assembly 48' is fitted to the top side of the rear end of the upper side member 14'.

Many or all of the individual metal components of the front sub-assembly 10 are preferably formed from stamped metal such as steel or aluminum. Some or all of the various brackets may be alternatively cast iron or aluminum components.

Each of the embodiments set forth above overcomes the challenges faced by designers of front end assemblies for automotive vehicles. It is to be understood that the foregoing discussion discloses and describes exemplary embodiments of the disclosed invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A vehicle front sub-assembly comprising:
   a pair of spaced apart side assemblies, each side assembly including an upper side member and a lower side member;
   a front cross member;
   a rear cross member comprising an upper cross member and a lower cross member, said upper cross member including a substantially u-shaped cut out area; and
   a substantially u-shaped roll restrictor bracket for substantial placement within said cut out area of said upper cross member.

2. The vehicle front sub-assembly of claim 1 wherein said front cross member comprises a reinforcing bracket.

3. The vehicle front sub-assembly of claim 2 wherein said front cross member comprises an internal mass dampener.

4. The vehicle front sub-assembly of claim 3 further including a front control arm bracket attached to each of said lower side members.

5. The vehicle front sub-assembly of claim 4 wherein each of said side assemblies includes a front area and wherein a front body mount bracket is attached to each of said side assemblies at said front area.

6. The vehicle front sub-assembly of claim 5 further including a body mount top plate and an outer body mount bracket.

7. The vehicle front sub-assembly of claim 5 further including an exhaust mount bracket.

8. The vehicle front sub-assembly of claim 5 wherein the side assemblies, the front cross member, the rear cross member and the roll restrictor are formed from stamped steel.

9. A vehicle front sub-assembly comprising:
   a pair of spaced apart side assemblies;
   a front cross member comprising a reinforcing bracket forming a channel and an internal mass dampener fitted in said channel;
   a rear cross member comprising upper and lower cross members, said upper cross member including a substantially u-shaped cut out area; and
   a substantially u-shaped roll restrictor bracket for substantial placement within said cut out area of said upper cross member.

10. The vehicle front sub-assembly of claim 9 wherein each of said spaced apart side assemblies includes an upper side member and a lower side member.

11. The vehicle front sub-assembly of claim 10 further including a front control arm bracket attached to each of said lower side members.

12. The vehicle front sub-assembly of claim 11 wherein each of said side assemblies includes a front area and wherein a front body mount bracket is attached to each of said side assemblies at said front area.

13. The vehicle front sub-assembly of claim 12 further including a body mount top plate and an outer body mount bracket.

14. The vehicle front sub-assembly of claim 13 further including an exhaust mount bracket.

15. The vehicle front sub-assembly of claim 13 wherein the side assemblies, the front cross member, the rear cross member and the roll restrictor are formed from stamped steel.

16. A vehicle front sub-assembly comprising:
   a pair of spaced apart side assemblies;
   a front cross member comprising an upper portion, a lower reinforcing bracket forming a channel and an internal mass dampener fitted in said channel;
   a rear cross member comprising upper and lower cross members, said upper cross member including a u-shaped cut out area; and
   a u-shaped roll restrictor bracket for insertion into said cut out area of said upper cross member.

17. The vehicle front sub-assembly of claim 16 wherein each of said spaced apart side assemblies includes an upper side member and a lower side member.

18. The vehicle front sub-assembly of claim 17 further including a front control arm bracket attached to each of said lower side members and wherein each of said side assemblies includes a front area and wherein a front body mount bracket is attached to each of said side assemblies at said front area.

\* \* \* \* \*